United States Patent Office 3,547,642
Patented Dec. 15, 1970

3,547,642
PHOTOGRAPHIC LAYERS CONTAINING GELATIN AND METHYLOL POLYVINYL URETHANE
Fumihiko Nishio and Kinji Ohkubo, Kanagawa, and Tsutomu Ikeda, Tokyo, Japan, assignors to Fuji Shashin Film Kabushiki Kaisha, Kanagawa, Japan
No Drawing. Filed June 3, 1966, Ser. No. 555,000
Claims priority, application Japan, June 4, 1965, 40/32,658
Int. Cl. G03c 1/78, 1/86
U.S. Cl. 96—84                                    9 Claims

ABSTRACT OF THE DISCLOSURE

A photographic element comprising a layer comprising gelatin, methylol polyvinyl urethane and a hardening agent.

---

The present invention relates to photography and more particularly to a photographic element having good dimensional stability and less curling tendency.

In general, a photographic silver halide emulsion is prepared by dispersing microcrystals of silver iodide, silver bromide, silver chloride or a mixture thereof in a protective colloidal medium, such as gelatin, polyvinyl alcohol or other natural and synthetic high molecular materials. By applying such a photographic silver halide emulsion as a thin layer onto a support, such as paper, glass plate or a film of a synthetic high molecular material, photographic printing papers, photographic plates or photographic films are produced.

Owing to its excellent photographic property, gelatin is most generally used as the protective colloid. However, the photographic coating of gelatin has, as its undesirable defect, a shrinking tendency with change of water content caused by a change in humidity in the air after treatment in wet process, that is, the gelatin coating is lacking in dimensional stability.

Various studies have been made to overcome this difficulty, and as one of these improvements there is provided a method wherein a part of gelatin is replaced with a synthetic high molecular material, about which there are many patents. (Cf., Japanese patent applications 17702/'64 and 24142/'64; British patent specification 961,490; Belgian patent specification 627,454 and Germany patent application 1,173,795.) It is, therefore, an object of the present invention to provide a photographic element having an improved dimensional stability and a reduced curling tendency.

According to the present invention, there is provided a photographic layer which comprises a support and a photographic layer having in intimate association therewith a substantial quantity of gelatin and methylol polyvinyl urethane.

It has been found that the use of photographic layers containing the above constituents provides photographic elements having improved dimensional stability and a reduced curling tendency, and further a remarkably reduced tackiness at high humidity conditions.

The methylol polyvinyl urethane used in this invention may be prepared by reacting polyvinyl alcohol with urea with or without the use of solvent, such as formamide or dimethylformamide to obtain polyvinyl urethane and reacting the resulting polyvinyl urethane with formaldehyde in an alkaline medium.

Polyvinyl alcohol used as a starting material of methyl polyvinyl urethane may have a saponification value of above 88 mole percent, and a polymerization degree of 500 to 1700. In the above mentioned process the polyvinyl alcohol is converted into polyvinyl urethane by the reaction of urea with the hydroxyl group of from 10 to 30 mole percent of the whole hydroxyl group of the polyvinyl alcohol, and further 70 to 150 mole percent of the urethane group of the polyvinyl urethane is methylolated by formaldehyde to obtain methylol polyvinyl urethane.

The prepared methylol polyvinyl urethane may be suitably used in this invention. A blending ratio of the methylol urethane to gelatin of 0.05–0.4:1 by weight is preferable. If the proportion of the methylol polyvinyl urethane is less than 1% of gelatin by weight, the effect caused by the addition of the polyvinyl urethane is not so remarkable, and, if more than 40% of gelatin by weight is used, the emulsion becomes difficult to coat due to the increase of the viscosity. The methylol polyvinyl urethane may be used together with other water-soluble high molecular material compatible with gelatin, such as polyvinyl alcohol, polyvinyl pyrrolidone, β-hydroxyethyl polyvinyl alcohol, a copolymer of vinylmethyl ether and maleic anhydride, and the like. Further, the methylol polyvinyl urethane may be used with a sensitizing dye, an antifogant, a coating aid, a matting agent, a gelatin hardening agent, and the like.

The above description is concerned with the case where methylol polyvinyl urethane is used in a light-sensitive layer containing a silver halide emulsion, but in the invention, the methylol polyvinyl urethane may be used in other photographic layers, such as a protective layer, a backing layer for antihalation, or an image-receiving layer used for copying by a silver-complex diffusion transfer process to provide photographic materials having improved dimensional stability and a reduced curling tendency.

The remarkable effects obtained by the addition of methylol polyvinyl urethane are considered to result from the fact that when the photographic material for forming a photographic layer as mentioned above is applied onto a paper or a film, a cross-linking reaction occurs among molecules or between methylol polyvinyl urethane and gelatin by the action of a hardening agent while it is allowed to stand at room temperature, which contributes to the prevention of curling and to a reduction in stickiness.

In order that the invention may further be understood, the following examples are given by way of illustration only.

EXAMPLE I

Into 100 g. of a pure silver chloride emulsion containing 3.5 g. of silver chloride and 13 g. of gelatin was added 30 ml. of a 10% aqueous solution of methylol polyvinyl urethane (urethanized degree; 20 mole percent to whole hydroxyl group, and metholated degree; 100 mole percent to whole urethane group) which had been prepared from polyvinyl alcohol having a polymerization degree of 1700 and a saponification value of 98 mole percent. The emulsion was mixed with 2 g. of hydroquinone and suitable amounts of a coating agent and a hardening agent and after adjusting the pH to 5.0 to 5.5, was applied to a photographic paper and dried.

The printing paper was exposed and processed in an activating solution and a stabilizing solution having the following compositions:

Activating solution

|   | G. |
|---|---|
| Sodium hydroxide | 40 |
| Sodium sulfite | 30 |
| Potassium bromide | 1 |

Water to make 1 liter.

Stabilizing solution

| | |
|---|---|
| Ammonium thiocyanate | g__ 175 |
| Sodium borate | g__ 2 |
| Potassium metabisulfite | g__ 130 |
| Formaldehyde (20%) | ml__ 150 |
| Thiosalicylic acid (1% methyl alcoholic solution) | ml__ 100 |

Water to make 1 liter.

The obtained, semi-dried, photographic print had a quick drying property and had less shrinkage by the change in water content of the coated layer caused by the change in humidity in the air when it was allowed to stand after wet processing, as well as less stickiness as compared with a photographic print where only gelatin was used, without the use of methylol polyvinyl urethane.

EXAMPLE II

Into 100 g. of a silver chlorobromide emulsion (content of silver bromide 10 mole percent) containing 4 g. of silver halides and 12 g. of gelatin was added 20 ml. of a 10% aqueous solution of methylol polyvinyl urethane (urethanized degree; 10 mole percent to whole hydroxyl group, and methylolated degree; 150 mole percent to whole urethane group) which had been prepared from polyvinyl alcohol having a polymerization degree of 500 and a saponification value of 98.8 mole percent. The emulsion was mixed with 3 g. of hydroquinone, suitable amounts of a coating aid and a hardening agent, and after adjusting the pH to 5.0–5.5 was applied to a photographic baryta paper of 150 g./sq. m.

The prepared printing paper was processed, after being exposed, in the activating solution and the stabilizing solution as in Example I.

The obtained semi-dried photographic print had a quick-drying property and had less shrinkage as a result of the change in water content of the coated layer caused by the change in humidity in the air when it was allowed to stand after wet processing, as well as less stickiness as compared with a photographic print where only gelatin was used, without the use of methylol polyvinyl urethane.

EXAMPLE III

On the light-sensitive silver halide emulsion layer, described in Example II, was coated as a protective layer a solution having the following composition:

| | |
|---|---|
| Gelatin | g__ 18 |
| Methylol polyvinyl urethane (10% aq. soln.) | ml__ 50 |
| Formaldehyde (6%) | ml__ 10 |
| Saponin (6% alc. soln.) | ml__ 6 |

Water to make 1 liter.

After drying, the prepared photographic, light-sensitive material was exposed and processed in the activating solution and then in the stabilizing solution, as in Example II, to provide a semi-dried photographic print. The photographic print showed a proper mattness and had less stickiness and less curling tendency even at low humidity. The photograph also had excellent photographic properties, substantially the same as those of a photographic print subjected to usual processing (i.e., fixing, water-rinsing and drying).

The methylol polyvinyl urethane had been prepared using polyvinyl alcohol of 1700 in polymerization degree and 98.8 mole percent in saponification value, and the urethanized degree of the methylol polyvinyl alcohol was 30 mole percent to whole hydroxyl group and the methylolated degree thereof was 70 mole percent to whole urethane group.

EXAMPLE IV

Into 100 g. of a pure silver chloride emulsion containing 4.0 g. of silver chloride and 12.5 g. of gelatin was added 30 ml. of a 10% aqueous solution of methylol polyvinyl urethane. The emulsion was mixed with 0.9 g. of hydroquinone, suitable amounts of a coating aid, a stabilizer, a matting agent, and a hardening agent, and, after adjusting the pH to 4.5 to 5.0, was applied to a transparent film. When processing the prepared film, after exposure, in the activating solution and then the stabilizing solution as in Example I, a photographic print having a quick-drying property and having less curling tendency, even at a low humidity, and less stickiness was obtained. The photographic print can be used as an intermediate for diazo-type light-sensitive paper printing without any after-treatment.

EXAMPLE V

A manganese dioxide-containing colloid was dispersed in a gelatin solution to provide an antihalation coating liquid having the following composition:

| | |
|---|---|
| Gelatin | g__ 75 |
| Manganese dioxide | g__ 115 |
| Water | ml__ 770 |
| Methylol polyvinyl urethane (10% aq. soln.) | ml__ 50 |

The antihalation liquid was mixed with a coating aid and a hardening agent. The coating composition was suitable for an antihalation layer for the transparent film having the emulsion layer as described in Example IV. The methylol polyvinyl urethane used was the same as in Example III.

EXAMPLE VI

A gelatino-silver halide emulsion containing 50 g. of gelatin and 24 g. of silver chlorobromide containing 30 mole percent of silver bromide was mixed with suitable amounts of a hardening agent, a coating aid, a fluorescent whitening agent and the like and applied to a photographic baryta paper of 150 g./sq. m. On the formed emulsion layer in a gel state there was coated a solution consisting of 20 g. of gelatin, 1 g. of methylol polyvinyl urethane (urethanized degree; 20 mole percent to whole hydroxyl group and methylolated degree; 100 mole percent to whole urethane group) that had been prepared from polyvinyl alcohol having a polymerization degree of 1000 and a saponification value of 88 mole percent), 15 ml. of formaldehyde (6%), 6 ml. of saponin (6% alcoholic solution, 20 ml. of sorbitan monolaurate (1%), and 1 liter of water, followed by drying.

The obtained glossy printing paper for enlargement had less curling tendency and good ferrotyping property.

EXAMPLE VII

| | |
|---|---|
| Gelatin | g__ 30 |
| Methylol polyvinyl urethane (10% aq. soln.) | ml__ 40 |

Water to make 960 ml.

The solution having the above composition was mixed with 0.1 g. of nickel sulfide and after the addition of usual additives such as a surface active agent, a toning agent, a fluorescent whitening agent and the like, was applied to a photographic paper of about 90 g./sq. m. After drying, a 2% carboxymethyl cellulose solution containing 3 g. of crystalline sodium thiosulfate and 0.1 g. of sodium sulfite was applied on the formed emulsion layer and dried.

The obtained positive paper for a silver-complex diffusion transfer process and a reduced curling property and excellent photographic properties (transfer speed, density, color tone, whiteness, stripping property, etc.). The methylol polyvinyl urethane used was same as in Example II.

What we claim is:

1. A photographic silver halide element of improved dimensional stability having a reduced tendency to curl comprising
   a support, and
   at least one layer coated on said support comprising gelatin and methylol polyvinyl urethane and a hardening agent, the ratio of said methylol polyvinyl urethane to said gelatin being in the range of from about 0.05:1 to about 0.4:1, dry basis, said methylol polyvinyl urethane and said gelatin being cross-linked by said hardening agent.

2. An element as claimed in claim 1 wherein said layer is a light-sensitive silver halide emulsion layer.

3. An element as claimed in claim 1 wherein said layer is a protective layer.

4. An element as claimed in claim 1 wherein said layer is an antihalation layer.

5. An element as claimed in claim 1 wherein said layer is an image-receiving layer for a photographic silver-complex diffusion transfer process.

6. The photographic element of claim 1 wherein said methylol polyvinyl urethane has a degree of polymerization within the range of from about 500 to 1700.

7. The photographic element of claim 1 wherein said methylol polyvinyl urethane is formed from polyvinyl alcohol having a saponification value of greater than 88 mole percent, and a polymerization degree of about 500 to about 1700, from about 10 to about 30 mole percent of the hydroxyl groups on said polyvinyl alcohol being reacted with urea to thereby yield polyvinyl urethane, said polyvinyl urethane being reacted with formaldehyde to thereby yield methylol polyvinyl urethane.

8. The photographic element of claim 1 wherein said layer consists essentially of said gelatin and said methylol polyvinyl urethane and said hardening agent.

9. The photographic element of claim 1 wherein said hardening agent is formaldehyde.

References Cited

UNITED STATES PATENTS 2,514,689  7/1950  Woodward et al. _____ 96—85
2,691,604  10/1954  Priest et al. _____ 96—85

RONALD H. SMITH, Primary Examiner

U.S. Cl. X.R.

96—85, 87, 114